United States Patent [19]

Kroner

[11] 3,824,412

[45] July 16, 1974

[54] CIRCUIT ARRANGEMENT FOR THE PHASE ADJUSTMENT OF A PAL SWITCH

[75] Inventor: Klaus Kroner, Hamburg, Germany

[73] Assignee: U.S. Philips Corporation, New York, N.Y.

[22] Filed: Aug. 30, 1972

[21] Appl. No.: 285,025

[30] Foreign Application Priority Data

Dec. 19, 1969 Germany .................... 1963820

Related U.S. Application Data

[63] Continuation of Ser. No. 91,658, Nov. 23, 1970, abandoned.

[52] U.S. Cl. ............ 307/269, 178/5.4 P, 328/201, 331/20, 331/113

[51] Int. Cl. .................... H03k 3/282, H03k 5/153

[58] Field of Search ............ 307/269; 331/20, 113; 328/201; 178/5.4 P

[56] References Cited

UNITED STATES PATENTS

| | | | |
|---|---|---|---|
| 3,492,417 | 1/1970 | Scholz | 178/5.4 |
| 3,534,156 | 10/1970 | Henze | 178/5.4 P |
| 3,553,357 | 1/1971 | Carnt | 178/5.4 P |
| 3,588,323 | 6/1971 | Krause | 178/5.4 |

*Primary Examiner*—John Zazworsky
*Attorney, Agent, or Firm*—Frank R. Trifari; Henry I. Steckler

[57] ABSTRACT

A PAL TV receiver has a multivibrator switching at one half of the line frequency and a circuit for stopping the switching operation if a PAL switch is out of phase with the chroma burst. A capacitor circuit is provided for releasing the stopping circuit so that the switch does not stop switching for too long a period.

3 Claims, 1 Drawing Figure

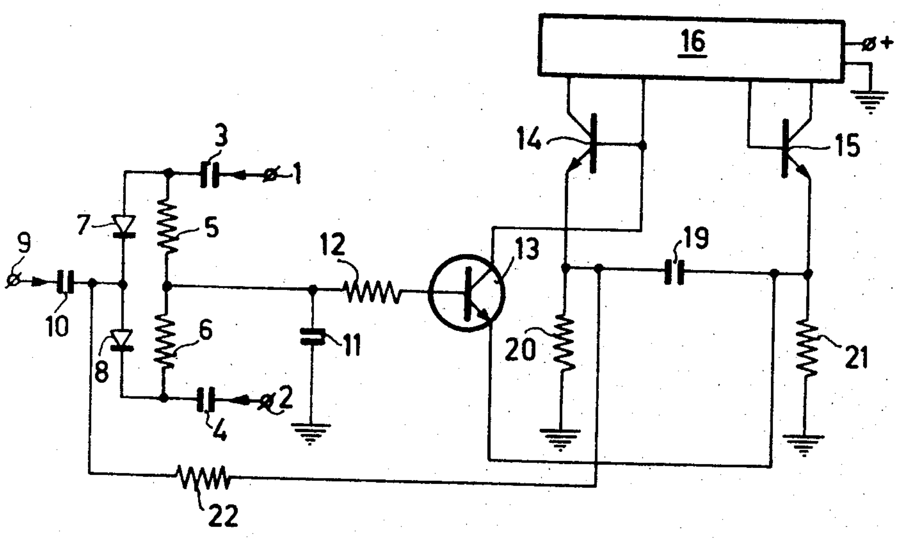
INVENTOR.
KLAUS KRÖNER
BY
AGENT

CIRCUIT ARRANGEMENT FOR THE PHASE ADJUSTMENT OF A PAL SWITCH

This is a continuation, of application Ser. No. 91,658, filed Nov. 23, 1970, and now abandoned.

The invention relates to a circuit arrangement for the phase adjustment of a PAL switch operating at half the line frequency and being stopped at the appearance of a direct voltage indicating an erroneous phase position of the switch.

In such a circuit arrangement a direct voltage may also appear in the event of an erroneous reference oscillator - burst signal phase relationship and a stopped switch, which voltage in that case causes a permanent stop of the switch; thus changing over to a correct operation is prevented.

This may be avoided in a simple manner in accordance with the invention by deriving a direct voltage in the stopped state of the switch from an output circuit of the switch via a delay member and by applying it to one input of the arrangement in a sense releasing the stop. It is thus achieved that the switch restarts its periodical operation, after which the feedback control-magnitude disappears and the normal correction circuit becomes operative.

The invention will be described more fully hereinafter by way of example at the hand of the drawings which contain only one FIGURE.

From input terminals 1 and 2 colour synchronizing signals of opposite polarities are supplied via coupling capacitors 3 and 4 of 4.7 $\mu$F to a series combination of two resistors 5 and 6 of 100 kOhms each and, moreover, to a cascade connection of two diodes 7 and 8. A reference signal of a local colour carrier oscillator is supplied from a terminal 9 via a coupling capacitor 10 of 0.1 $\mu$F. The relative phase positions of the colour synchronizing signal and of the reference signal are changed over by means of a changeover switch (multivibrator) at half the line frequency. A direct voltage appears at the colour-carrier phase discriminator thus formed at the junction of the resistors 5 and 6 with respect to the ground-connected junction of the diodes 7 and 8, the polarity of said voltage depending upon whether the change-over of the colour synchronizing signal (burst) determined by the transmitter corresponds or does not correspond with the change-over of the relative phase positions of the oscillator signal and of the colour synchronizing signal produced in the receiver. In the event of corresponding changes-over a negative voltage appears across an output capacitor 11 of 0.1 $\mu$F and cuts off an npn-type transistor 13 via a series resistor 12 of 47 kOhms.

In known manner the change-over switch (multivibrator) is formed by two npn-transistors 14 and 15. The collectors and bases are appropriately connected to each other through a network supply member 16 and the emitters are normally common and connected to the other terminal of the supply source, particularly to ground. Through the feedbacks caused by the network the multivibrator 14, 15, 16 produces square-wave oscillations of the desired frequency, which may furthermore be synchronized from the outside. The collector of the transistor 13 is connected to the base of the transistor 14. When a positive direct base voltage drives the transistor 13 strongly, the collector voltage thereof drops considerably to an extent such that the transistor 14 is cut off so that the multivibrator is stopped for a short time. As a result the correct phase position of the switch and consequently of the change over of the colour synchronizing signal relative to the reference signal is adjusted and the driving voltage of the transistor 13 disappears so that this transistor is cut off. Then the multivibrator continues operating without interruption.

However, if the phase relation between the burst signals and the reference signal of the terminal 9 differs somewhat from the desired value, a direct voltage may appear across the capacitor 11 even when the multivibrator is stationary. In that case without assessment of the phase position between the change-over of the colour synchronizing signal and the change-over which does not occur in that case at the receiver end at half the line frequency, said direct voltage across capacitor 11 driving the transistor 13 continues and thus stops the multivibrator 14, 15, 16.

According to the invention the emitters of the transistors 14 and 15 are therefore not directly connected, but coupled with each other via a large capacitor 19 of, for example 10 $\mu$F; moreover, each emitter is connected to ground via a resistor 20 and 21 respectively of 100 Ohms. In normal operation the two transistors 14 and 15 are alternately conducting for approximately equal periods of time so that the average direct voltage at the two resistors 20 and 21 amounts to about 0.9 V, whereas substantially no voltage appears at the capacitor 19. This situation is not changed in any way when the switch is stopped for a short time for phase correction. The emitters of the two transistors 14 and 15 remain approximately at the same voltage, even when for some time no current passes through the emitter resistor 20.

However, if in the event of disturbance as stated above the direct voltage across the capacitor 11 occurs for a longer time, the transistor 14 being cut off via the transistor 13, the capacitor 19 is recharged so that its electrode connected to the resistor 20 becomes more negative and its electrode connected to the resistor 21 becomes more positive.

The emitter of the transistor 13 is connected to the emitter of the transistor 15 and the emitter of the transistor 14 is connected via a separation resistor 22 of, for example, 22 kOhms to the junction of the diodes 7 and 8 and hence to the base of the transistor 13. When the said disturbing direct voltage stops the multivibrator 14, 15, 16 for a longer time, the capacitor 19 is charged and supplies a negative base-emitter voltage for the transistor 13 so that the latter is cut off and the multivibrator is restarted. Since multivibrator 14, 15 controls the phase of the local chrominance carrier reference signal applied to terminal 9 through network 16 and a switch (not shown), this results again in a change-over of the reference signal applied to the terminal 9 and phase errors, if any, of the reference oscillator become inoperative so that the arrangement is again responsive to the phase position relative to the colour synchronizing pulse.

Consequently the voltage across the capacitor 19 operates as a temporarily operative feedback or release circuit voltage of the multivibrator; this principle may, of course, also be applied to other circuit elements. For example, a voltage at a different point of the multivibrator may be used for obtaining a decreasing stopping voltage or, for example, detection of the alternating output voltage of the multivibrator may be performed.

The voltage across the stopping transistor 13 may, of course, also be applied to a different electrode of said transistor, whilst this locking transistor may also be arranged at other points of the arrangement for stopping the multivibrator. As a matter of course, stopping of the multivibrator may be carried out by other means. In general, this requires a locking circuit actuated by a locking voltage, the action of which is suppressed, when the multivibrator is locked for a fairly long time, until the multivibrator has again performed at least one change-over.

What is claimed is:

1. A circuit for a color television signal having a phase alternating color synchronizing signal and a given line frequency, said circuit comprising a PAL switch operating at one half of said line frequency, said switch operation defining a phase relationship with respect to said phase alterations of said synchronization signal, means for stopping said switch if it is out of phase with the color synchronizing signal, and means for causing said switch to resume switching after it has been stopped by said stopping means for a predetermined time regardless of the phase of said switch with respect to said synchronizing signal, said causing means comprising a delay circuit coupled to said switch and means for deriving a direct current from said delay circuit indicative of the stopped state of said switch.

2. A circuit as claimed in claim 1 wherein said switch comprises a pair of transistors each having an emitter, said delay circuit comprises a capacitor coupled between said emitters, and said deriving means comprises means coupled to said capacitor for applying said direct current to one of said transistors to render it conductive.

3. A circuit as claimed in claim 2 wherein said applying means comprises a third transistor coupled to said capacitor and to said one transistor.

* * * * *

PO-1050
(5/69)

UNITED STATES PATENT OFFICE
CERTIFICATE OF CORRECTION

Patent No. 3,824,412 Dated July 16, 1974

Inventor(s) KLAUS KRONER

It is certified that error appears in the above-identified patent and that said Letters Patent are hereby corrected as shown below:

IN THE TITLE PAGE cancel "1963820" and insert -- P.1963820.1 --;

Signed and sealed this 8th day of October 1974.

(SEAL)
Attest:

McCOY M. GIBSON JR.
Attesting Officer

C. MARSHALL DANN
Commissioner of Patents